(12) United States Patent
Gupta et al.

(10) Patent No.: US 10,885,652 B2
(45) Date of Patent: Jan. 5, 2021

(54) TRAILER ANGLE DETECTION SYSTEM FOR VEHICLE

(71) Applicant: MAGNA ELECTRONICS INC., Auburn Hills, MI (US)

(72) Inventors: Nikhil Gupta, Brampton (CA); Jyothi P. Gali, Rochester Hills, MI (US); Galina Okouneva, Markham (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 53 days.

(21) Appl. No.: 15/928,126

(22) Filed: Mar. 22, 2018

(65) Prior Publication Data

US 2018/0276838 A1 Sep. 27, 2018

Related U.S. Application Data

(60) Provisional application No. 62/474,645, filed on Mar. 22, 2017.

(51) Int. Cl.
| | |
|---|---|
| *G06K 9/00* | (2006.01) |
| *G06T 7/60* | (2017.01) |
| *B60R 1/00* | (2006.01) |
| *G06T 7/70* | (2017.01) |
| *G06T 7/20* | (2017.01) |
| *B62D 15/02* | (2006.01) |
| *B62D 13/06* | (2006.01) |
| *G01B 11/26* | (2006.01) |
| *G06T 7/73* | (2017.01) |

(52) U.S. Cl.
CPC .................. *G06T 7/60* (2013.01); *B60R 1/00* (2013.01); *B62D 13/06* (2013.01); *B62D 15/027* (2013.01); *G01B 11/26* (2013.01); *G06T 7/20* (2013.01); *G06T 7/70* (2017.01); *G06T 7/73* (2017.01); *B60R 2300/8066* (2013.01); *B60R 2300/8093* (2013.01); *G06T 2207/30252* (2013.01)

(58) Field of Classification Search
CPC .............. B60R 1/00; B60R 2300/8066; B60R 2300/8093; B62D 13/06; B62D 15/027; G01B 11/26; G06T 2207/30252; G06T 7/20; G06T 7/60; G06T 7/70; G06T 7/73
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |

(Continued)

*Primary Examiner* — Xin Jia
(74) *Attorney, Agent, or Firm* — Honigman LLP

(57) ABSTRACT

A trailer angle detection system for a vehicle towing a trailer includes a camera disposed at a rear portion of a vehicle so as to have a field of view exterior and rearward of the vehicle, and an image processor operable to process image data captured by the camera. Responsive to processing of a region of interest of image data captured by the camera, the trailer angle detection system determines the location of a known patterned target at the trailer being towed by the vehicle. Responsive to determination of the location of the target, the system determines a region of interest of the captured image data that encompasses the target. Responsive to processing of image data of the region of interest and determining the location of the target relative to the vehicle centerline, the trailer angle detection system calculates an angle of the trailer relative to the vehicle centerline.

20 Claims, 4 Drawing Sheets

(56) References Cited

U.S. PATENT DOCUMENTS

| | | | |
|---|---|---|---|
| 5,949,331 A | 9/1999 | Schofield et al. | |
| 6,690,268 B2 | 2/2004 | Schofield et al. | |
| 8,930,140 B2 | 1/2015 | Trombley et al. | |
| 9,085,261 B2 | 7/2015 | Lu et al. | |
| 9,296,422 B2 | 3/2016 | Lavoie | |
| 9,446,713 B2 | 9/2016 | Lu et al. | |
| 9,558,409 B2 | 1/2017 | Pliefke et al. | |
| 2010/0256863 A1* | 10/2010 | Nielsen | G07C 5/085 701/31.4 |
| 2014/0085472 A1 | 3/2014 | Lu et al. | |
| 2014/0160276 A1 | 6/2014 | Pliefke et al. | |
| 2015/0002670 A1 | 1/2015 | Bajpai | |
| 2015/0217693 A1 | 8/2015 | Pliefke et al. | |
| 2017/0050672 A1 | 2/2017 | Gieseke et al. | |
| 2017/0217372 A1 | 8/2017 | Lu et al. | |
| 2017/0254873 A1 | 9/2017 | Koravadi | |
| 2017/0297619 A1* | 10/2017 | Lavoie | B62D 6/002 |
| 2017/0349213 A1* | 12/2017 | Abdel-Rahman | B62D 6/003 |
| 2018/0215382 A1 | 8/2018 | Gupta et al. | |
| 2018/0253608 A1 | 9/2018 | Diessner et al. | |
| 2018/0276839 A1 | 9/2018 | Diessner et al. | |
| 2019/0016264 A1 | 1/2019 | Potnis et al. | |
| 2019/0039649 A1 | 2/2019 | Gieseke et al. | |
| 2019/0042864 A1 | 2/2019 | Pliefke et al. | |
| 2019/0064831 A1 | 2/2019 | Gali et al. | |
| 2019/0118860 A1 | 4/2019 | Gali et al. | |
| 2019/0143895 A1 | 5/2019 | Pliefke et al. | |

* cited by examiner

(12)  United States Patent

TRAILER ANGLE DETECTION SYSTEM FOR VEHICLE

CROSS REFERENCE TO RELATED APPLICATION

The present application claims the filing benefits of U.S. provisional application Ser. No. 62/474,645, filed Mar. 22, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle to assist a driver of the vehicle in maneuvering the vehicle with a trailer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

In some systems, when attaching a trailer to the vehicle, the driver has to enter its properties to put the trailer driving aid system into a position to properly calculate the driving aids overlays, when backing up with a trailer attached. Examples of trailer detection systems are described in U.S. Pat. Nos. 9,296,422 and 8,930,140, and U.S. Publication No. US-2014-0160276, which are hereby incorporated herein by reference in their entireties.

SUMMARY OF THE INVENTION

The present invention provides a driver assistance system or vision system or imaging system or trailer angle detection system for a vehicle that utilizes one or more cameras (preferably one or more CMOS cameras) to capture image data representative of images exterior of the vehicle, with the vehicle towing a trailer, and with the system determining the angle of the trailer relative to the vehicle. The system determines the location of a known patterned target at the trailer and, responsive to determination of the location of the target, the system determines a region of interest of the captured image data, with the determined region of interest encompassing the target. The system determines the location of the target relative to the vehicle centerline, and trailer angle detection system calculates an angle of the trailer relative to the vehicle centerline.

These and other objects, advantages, purposes and features of the present invention will become apparent upon review of the following specification in conjunction with the drawings.

DESCRIPTION OF THE PREFERRED EMBODIMENTS

Figure 1:
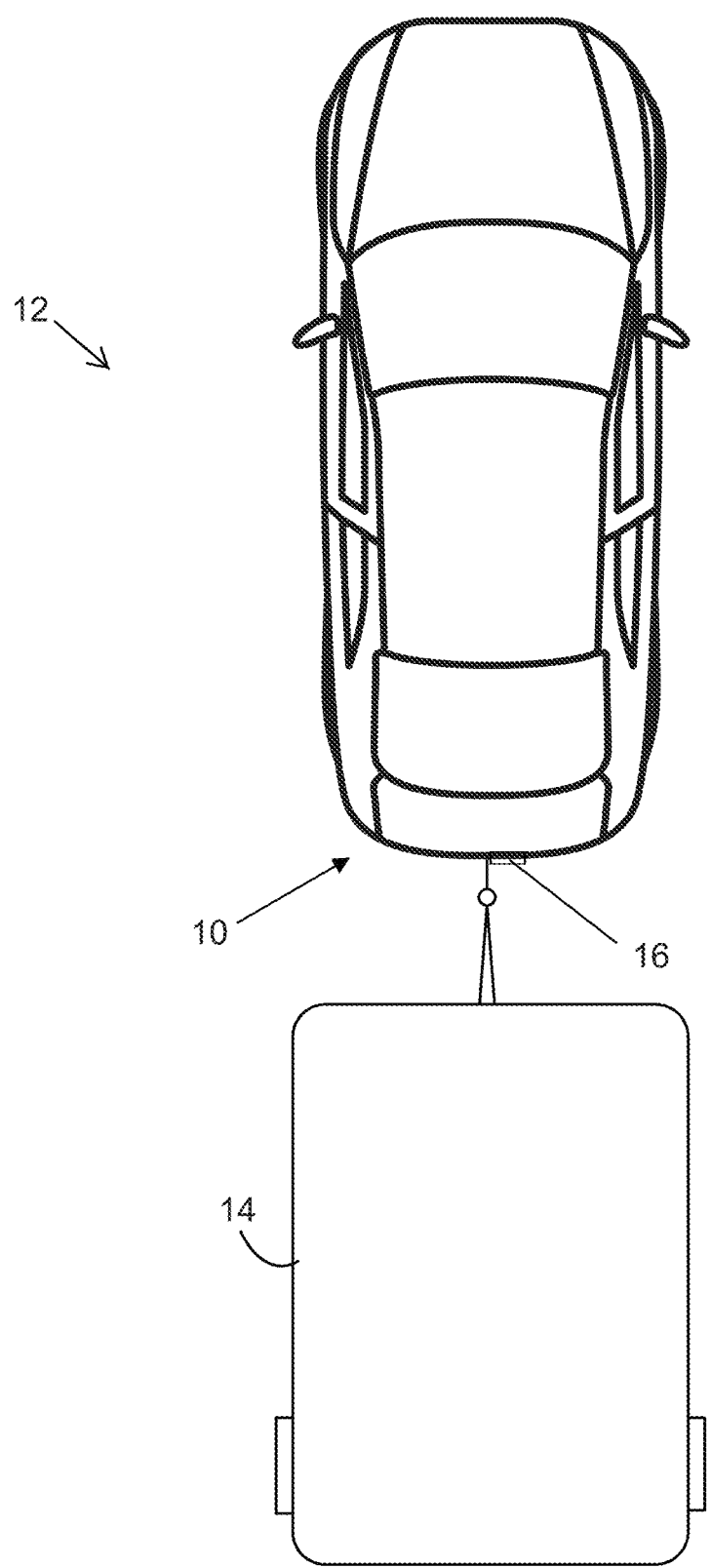
FIG. 1 is a plan view of a vehicle with a vision system that incorporates a camera for capturing image data representative of a trailer being towed by the vehicle.
Figure 2:
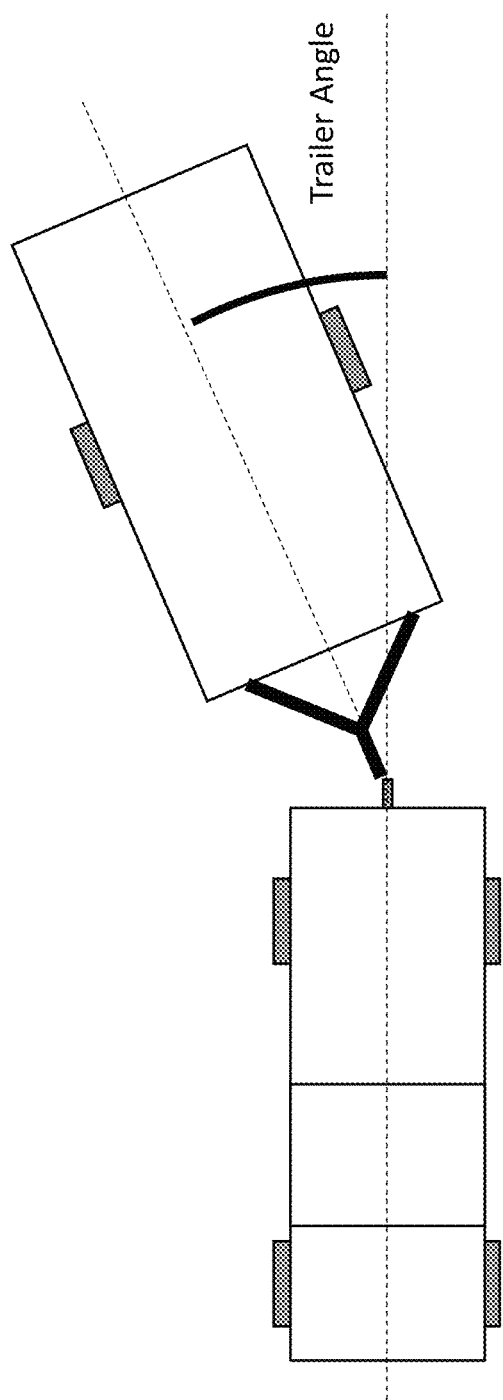
FIG. 2 is a plan view of the vehicle and trailer, showing the trailer angle of the trailer relative to the vehicle.

Referring now to the drawings and the illustrative embodiments depicted therein, a rear vision system 10 for a vehicle 12 is operable to detect the angle of a trailer 14 that is pulled behind the vehicle 12 by using a rear view camera or multi-camera surround view system (FIG. 1). A camera 16 is mounted at the rear end portion of the pulling vehicle 12. An image processor (such as a digital processor or FPGA or DSP or ASIC or camera imager SOC or other suitable processor or processing means) is operable to process the image data captured by the camera and, responsive to such processing of captured image data, determines the angle of the trailer in relation to the pulling vehicle in real time. The system of the present invention is operable to determine the trailer angle as the vehicle is driven and turned, such as at corners or the like, along a road, as discussed below. The system is operable to measure the angle (see FIG. 2) between a tow vehicle and trailer using the rear view camera.

While reversing a vehicle that has trailer attached, it is difficult to control the trailer path especially for new or inexperienced drivers. As a result, the trailer may move toward an unintended direction which may lead to jackknifing the trailer. For controlled backing up of the vehicle with a trailer attached to it, the backup assist system should calculate the angle of trailer with respect to vehicle center axis. Some known systems use a target (such as a checker board or known pattern) that is placed on a horizontal surface of the trailer along with the measurements of target placement including target-to-hitch ball, hitch ball-to-vehicle bumper, target height from the ground and/or the like.

Figure 3:
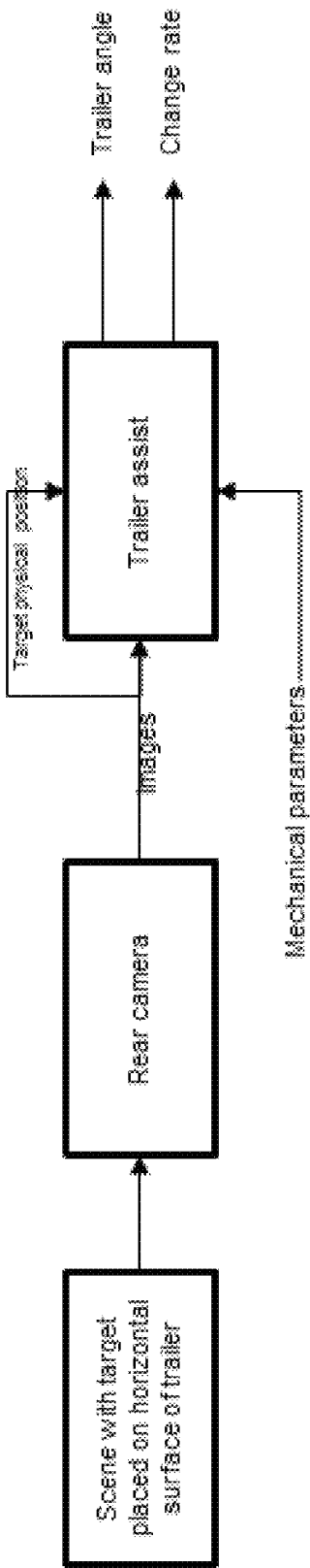
FIG. 3 is a block diagram of the trailer angle detection system of the present invention.

The system of the present invention identifies the presence of the trailer that is attached to the host vehicle by detecting the known patterned target placed on an either horizontal or vertical surface of the trailer. The system may automatically detect the position of the target in physical space (world coordinates), which will be used to measure the angular motion of the trailer. As shown in FIG. 3, the rear camera captures image data representative of the scene with the target at the trailer, and the system processes the captured image data in accordance with the target physical position and the known mechanical parameters to determine the trailer angle and change rate.

The trailer presence is determined by target localization in the physical world. Detection of the trailer presence is done via processing by an image processor of image data captured by the rearward viewing camera to detect the target in the captured image. The target may be a vertical or horizontal orientation and the orientation is detected. The target position in physical space, including height and horizontal distance between the target and the rear camera mounted on the car, is determined. The image processing also identifies the tow ball (using the vehicle's ego motion).

Figure 4:
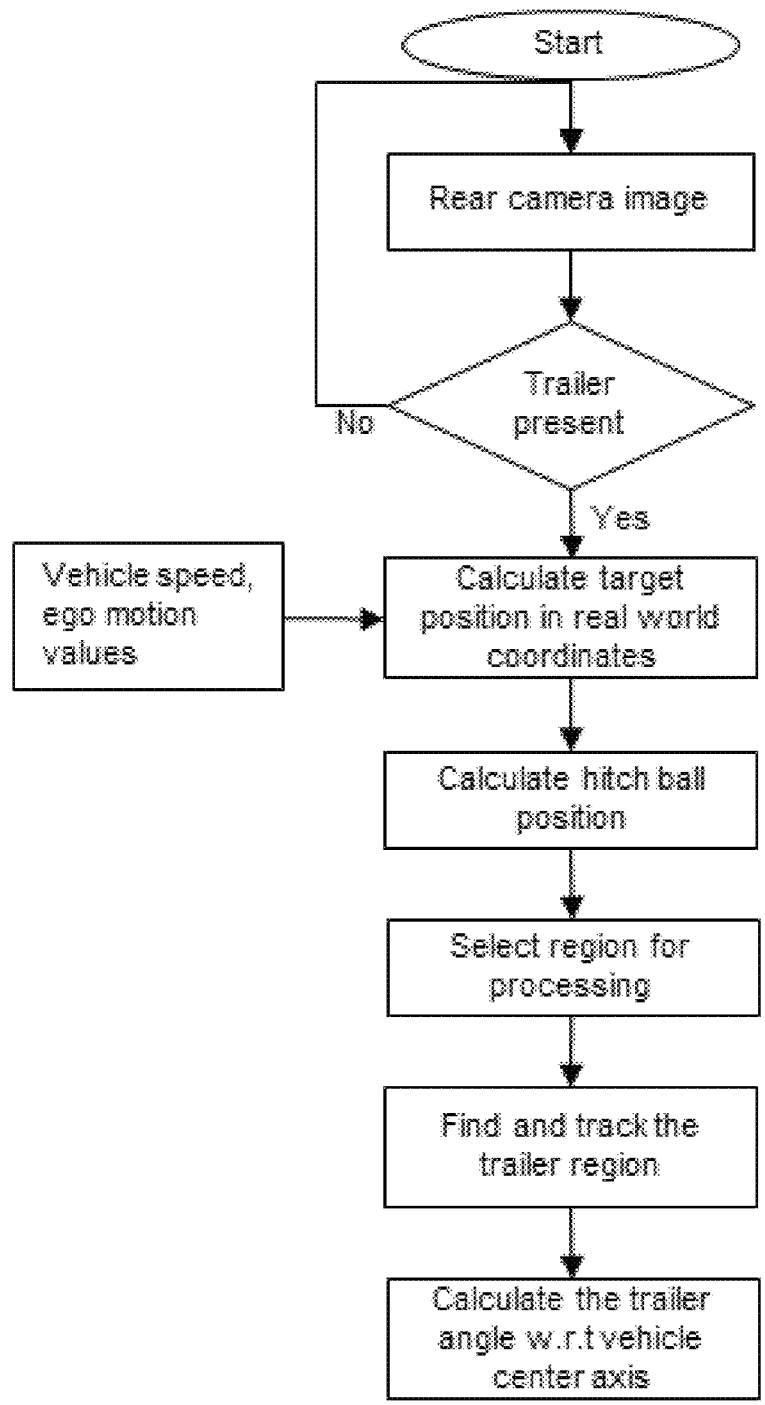
FIG. 4 is a flow chart of the image data processing in accordance with the trailer angle detection system of the present invention.

The process of the present invention is shown in FIG. 4. The system confines the processing to a region of interest (ROI) created in the input image around the target in which the size and shape of the target remains unchanged. This reduces the processing time to acquire the target. The system acquires the trailer region within the ROI using known features of the target placed on the trailer. The system tracks the trailer position with the inputs of vehicle parameters including vehicle speed, acceleration, and steering wheel angle. The system builds confidence to the tracker to avoid sudden drops in tracking the target and refining the target acquisition to smaller ROI. The system detects the trailer angle with respect to the center line of the vehicle using the trailer position in the processed image.

Therefore, the system may calculate the hitch ball position in the region which moves along with the vehicle. The system measures the distance between the vehicle and the target placed on the trailer, and differentiates a target placed on horizontal surface from a target placed on a vertical surface. The system measures the height of the target above the ground. Detection of the presence of trailer is done using a known pattern (target) and can be done as the vehicle and trailer travel on different surfaces, including asphalt, concrete, dirt, gravel, grass, water, sand, snow and/or the like, and in different ambient conditions, including day, dawn/dusk, night with minimum light of 6 lux. The system determines/predicts the position of the trailer over the time with the help of vehicle parameters and corresponding trailer location. The system thus avoid jackknifing the trailer by continuous detection and tracking of the trailer angle with respect to the vehicle center axis.

Therefore, the system of the present invention automatically identifies the presence of a trailer attached at the rear of the vehicle and calculates the trailer position in physical space. Thus the user does not need to collect the measurements between the target position with respect to the vehicle. The system operates in a controlled environment with known features of the target, and thus may be more accurate than a system with no target and may yield less false positives. The target can be placed anywhere in the visibility zone (field of view) of the rear camera of the vehicle and can be placed on either a horizontal or a vertical surface of the trailer body.

The system may utilize aspects of the trailering or trailer angle detection systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, and/or U.S. patent application Ser. No. 15/885,855, filed Feb. 1, 2018, and/or Ser. No. 15/910,100, filed Mar. 2, 2018, and/or U.S. provisional applications, Ser. No. 62/533,694, filed Jul. 18, 2017, Ser. No. 62/518,765, filed Jun. 13, 2017, Ser. No. 62/474,646, filed Mar. 22, 2017, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/

081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer angle detection system for a vehicle towing a trailer, said trailer angle detection system comprising:
a camera disposed at a rear portion of a vehicle so as to have a field of view exterior and rearward of the vehicle, the vehicle having a vehicle centerline;
a control comprising an image processor operable to process multiple frames of image data captured by said camera;
wherein, with the vehicle towing a trailer, and responsive to processing by said image processor of at least one frame of image data captured by said camera, said trailer angle detection system determines the location of a target at the trailer relative to said camera including vertical distance between the determined location of the target and said camera and horizontal distance between the determined location of the target and said camera;
wherein, responsive to determination of the location of the target, said system determines a region of interest of the at least one frame of captured image data, with the determined region of interest encompassing the determined target, and wherein the determined region of interest is less than the field of view of said camera;
wherein, responsive to determination of the region of interest of the at least one frame of captured image data, and via said image processor confining processing of image data to the region of interest of subsequent frames of captured image data, location of the target relative to the vehicle centerline is determined in the subsequent frames of captured image data; and
wherein, responsive at least in part to determination of the location of the target relative to the vehicle centerline, said trailer angle detection system determines angle of the trailer relative to the vehicle centerline.

2. The trailer angle detection system of claim 1, wherein said trailer angle detection system tracks the region of interest over multiple frames of captured image data.

3. The trailer angle detection system of claim 2, wherein said trailer angle detection system tracks the region of interest and determines angle of the trailer relative to the vehicle centerline responsive at least in part to vehicle data.

4. The trailer angle detection system of claim 3, wherein the vehicle data comprises vehicle speed and steering angle of the vehicle.

5. The trailer angle detection system of claim 3, wherein said trailer angle detection system tracks a reduced region of interest when tracking over multiple frames of captured image data to build confidence in tracking the region of interest.

6. The trailer angle detection system of claim 1, wherein said trailer angle detection system determines angle of the trailer relative to the vehicle centerline responsive at least in part to vehicle data.

7. The trailer angle detection system of claim 6, wherein the vehicle data comprises vehicle speed and steering angle of the vehicle.

8. The trailer angle detection system of claim 1, wherein said trailer angle detection system, at least in part responsive to image processing by said image processor of multiple frames of image data captured by said camera, determines location of the target in real world coordinates.

9. The trailer angle detection system of claim 8, wherein said trailer angle detection system, at least in part responsive to image processing by said image processor of the at least one frame of image data captured by said camera, determines location of a hitch ball of the vehicle.

10. The trailer angle detection system of claim 9, wherein said trailer angle detection system determines the region of interest at least in part responsive to the determined real world coordinates of the target location and the determined location of the hitch ball of the vehicle.

11. The trailer angle detection system of claim 1, wherein said trailer angle detection system determines angle of the trailer while the vehicle is at least one of (a) being driven along a curved road and (b) is turning at a corner of a road.

12. The trailer angle detection system of claim 1, wherein said trailer angle detection system determines angle of the trailer relative to the vehicle centerline independent of lighting conditions at the vehicle and trailer.

13. The trailer angle detection system of claim 1, wherein said trailer angle detection system determines angle of the trailer relative to the vehicle centerline independent of road surfaces along which the vehicle is towing the trailer.

14. A trailer angle detection system for a vehicle towing a trailer, said trailer angle detection system comprising:
a camera disposed at a rear portion of a vehicle so as to have a field of view exterior and rearward of the vehicle, the vehicle having a vehicle centerline;
a control comprising an image processor operable to process multiple frames of image data captured by said camera;
wherein, with the vehicle towing a trailer, and responsive to processing by said image processor of at least one frame of image data captured by said camera, said trailer angle detection system determines the location of a target at the trailer relative to said camera including vertical distance between the determined location of the target and said camera and horizontal distance between the determined location of the target and said camera;

wherein, responsive to determination of the location of the target, said system determines a region of interest of the at least one frame of captured image data, with the determined region of interest encompassing the determined target, and wherein the determined region of interest is less than the field of view of said camera;

wherein said trailer angle detection system tracks the region of interest over multiple frames of image data captured by said camera;

wherein said trailer angle detection system tracks the region of interest and determines angle of the trailer relative to the vehicle centerline responsive at least in part to vehicle data;

wherein, responsive to determination of the region of interest of the at least one frame of captured image data, and via said image processor confining processing of image data to the region of interest of subsequent frames of captured image data, location of the target relative to the vehicle centerline is determined in the subsequent frames of captured image data; and wherein, responsive at least in part to determination of the location of the target relative to the vehicle centerline, said trailer angle detection system determines angle of the trailer relative to the vehicle centerline.

15. The trailer angle detection system of claim 14, wherein the vehicle data comprises vehicle speed and steering angle of the vehicle.

16. The trailer angle detection system of claim 14, wherein said trailer angle detection system tracks a reduced region of interest when tracking over multiple frames of captured image data to build confidence in tracking the region of interest.

17. The trailer angle detection system of claim 14, wherein said trailer angle detection system determines angle of the trailer while the vehicle is at least one of (a) being driven along a curved road and (b) is turning at a corner of a road.

18. A trailer angle detection system for a vehicle towing a trailer, said trailer angle detection system comprising:
   a camera disposed at a rear portion of a vehicle so as to have a field of view exterior and rearward of the vehicle, the vehicle having a vehicle centerline;
   a control comprising an image processor operable to process multiple frames of image data captured by said camera;
   wherein, with the vehicle towing a trailer, and responsive to processing by said image processor of at least one frame of image data captured by said camera, said trailer angle detection system determines the location of a target at the trailer relative to said camera including vertical distance between the determined location of the target and said camera and horizontal distance between the determined location of the target and said camera;
   wherein, responsive to determination of the location of the target, said system determines a region of interest of the at least one frame of captured image data, with the determined region of interest encompassing the determined target, and wherein the determined region of interest is less than the field of view of said camera;
   wherein, responsive to determination of the region of interest of the at least one frame of captured image data, and via said image processor confining processing of image data to the region of interest of subsequent frames of captured image data, location of the target relative to the vehicle centerline is determined in the subsequent frames of captured image data;
   wherein, responsive at least in part to determination of the location of the target relative to the vehicle centerline, said trailer angle detection system determines angle of the trailer relative to the vehicle centerline;
   wherein said trailer angle detection system determines angle of the trailer relative to the vehicle centerline responsive at least in part to vehicle data; and
   wherein said trailer angle detection system determines angle of the trailer while the vehicle is at least one of (a) being driven along a curved road and (b) is turning at a corner of a road.

19. The trailer angle detection system of claim 18, wherein the vehicle data comprises vehicle speed and steering angle of the vehicle.

20. The trailer angle detection system of claim 18, wherein said trailer angle detection system, at least in part responsive to image processing by said image processor of the at least one frame of image data captured by said camera, determines location of a hitch ball of the vehicle, and wherein said trailer angle detection system determines the region of interest at least in part responsive to the determined target location and the determined location of the hitch ball of the vehicle.

* * * * *